UNITED STATES PATENT OFFICE.

LOUIS ENRICHT, OF NEW YORK, N. Y., ASSIGNOR TO THE ENRICHT MANUFACTURING COMPANY, OF SAME PLACE.

MANUFACTURE OF ARTIFICIAL STONE.

SPECIFICATION forming part of Letters Patent No. 449,214, dated March 31, 1891.

Application filed May 14, 1890. Serial No. 351,779. (No specimens.)

*To all whom it may concern:*

Be it known that I, LOUIS ENRICHT, a citizen of the United States, residing at New York, in the county and State of New York, have invented new and useful Improvements in the Manufacture of Artificial Stone, of which the following is a specification.

This invention relates to artificial stone, which I produce from hydrate of lime, an aqueous solution of magnesium chloride, burnt dolomite, and an aqueous solution of sodium silicate, as described and pointed out in the following specification and claims.

In carrying out the invention I proceed as follows, namely: I take dolomite and calcine the same at a red heat for from four to ten hours. From the powder obtained by this treatment I take about twelve ounces and treat the same with about nine ounces of hydrochloric acid of about 1.16 specific gravity. By the action of the hydrochloric acid upon the powdered calcined dolomite I obtain hydrate of lime and a solution of magnesium chloride of about 35° Baumé. With the hydrate of lime and the solution of magnesium chloride obtained by the treatment above described I mix twenty-four ounces of burnt dolomite in powder, and to this mixture I add about one ounce of a solution of sodium silicate of about 26° Baumé, and thereby produce a silicious magnesia limestone of great hardness.

It will be readily understood from the foregoing example of my invention that the quantity of burnt dolomite employed should be sufficient to neutralize the hydrochloric acid, and it is obvious, therefore, that the proportion of dolomite will have to be changed according to the nature of the dolomite employed. By the neutralization and treatment above described I produce about twenty-one ounces of hydrate of lime and of the solution of magnesium chloride, as above mentioned, which materials, when mixed with about twenty-four ounces of burnt dolomite and about one ounce of a solution of sodium silicate of about 26° Baumé, produce my new artificial stone, which possesses great hardness and is capable of resisting the influences of the atmosphere and of moisture and can be heated to a red heat without danger of crumbling or disintegration.

The proportions herein given are by weight.

My product will harden in ordinary temperatures in about twenty-four hours and attain its full hardness in from seven to nine days.

What I claim as new, and desire to secure by Letters Patent, is—

1. An artificial stone composed of a mixture of hydrate of lime, a solution of magnesium chloride of about 35° Baumé, burnt dolomite, and a solution of sodium silicate of about 26° Baumé, about in the proportions hereinbefore specified.

2. The within-described process for producing artificial stone, which consists in decomposing a quantity of burnt dolomite by the action of hydrochloric acid, then mixing the hydrate of lime and magnesium chloride solution obtained by said decomposition with burnt dolomite, and exposing the mixture to the action of an aqueous solution of sodium silicate, substantially as above described.

In testimony whereof I have hereunto set my hand in the presence of two subscribing witnesses.

LOUIS ENRICHT.

Witnesses:
WM. C. HAUFF,
E. F. KASTENHUBER.